United States Patent [19]

Gergen et al.

[11] Patent Number: 4,960,838

[45] Date of Patent: Oct. 2, 1990

[54] BLEND OF POLYKETONE POLYMER WITH AN AMORPHOUS POLYAMIDE POLYMER

[75] Inventors: William P. Gergen, Houston, Tex.; William W. C. Hart, Avon, Conn.

[73] Assignee: Shell Oil Company, Houston, Tex.

[21] Appl. No.: 278,098

[22] Filed: Nov. 30, 1988

[51] Int. Cl.$^5$ .............................................. C08L 77/06
[52] U.S. Cl. .................................. 525/426; 525/420; 525/421; 525/539
[58] Field of Search ................ 525/426, 420, 421, 539

[56] References Cited

U.S. PATENT DOCUMENTS

| | | | |
|---|---|---|---|
| 2,495,286 | 1/1950 | Brubaker | 260/63 |
| 3,150,117 | 9/1964 | Gabler | 260/78 |
| 3,294,755 | 12/1966 | Tanner | 260/78 |
| 3,637,551 | 1/1972 | Sprauer | 260/18 |
| 3,642,941 | 2/1972 | Schneider | 260/857 |
| 3,646,156 | 2/1972 | Schneider | 260/857 |
| 3,694,412 | 9/1972 | Nozaki | 260/63 |
| 3,875,129 | 1/1975 | Herwig | 260/857 |
| 4,137,382 | 1/1979 | Vetter | 525/426 |
| 4,404,317 | 9/1983 | Epstein | 524/538 |
| 4,410,661 | 10/1983 | Epstein et al. | 525/66 |
| 4,477,598 | 10/1984 | Kesting | 521/62 |
| 4,839,437 | 6/1989 | Gergen et al. | 525/426 |

FOREIGN PATENT DOCUMENTS

| | | |
|---|---|---|
| 121965 | 10/1984 | European Pat. Off. . |
| 181014 | 5/1986 | European Pat. Off. . |
| 1081304 | 8/1967 | United Kingdom . |

*Primary Examiner*—Harold D. Anderson
*Attorney, Agent, or Firm*—Dean F. Vance

[57] ABSTRACT

A composition comprising a blend of a linear alternating polymer of carbon monoxide and at least one ethylenically unsaturated hydrocarbon and an amorphous polyamide, a process for making the blend, and articles prepared thereof.

22 Claims, No Drawings

BLEND OF POLYKETONE POLYMER WITH AN AMORPHOUS POLYAMIDE POLYMER

BACKGROUND OF THE INVENTION

This invention is concerned with blends of polyketone polymers and amorphous polyamide polymers.

Amorphous polyamides, such as Zytel ™ 330 available from E. I. DuPont de Nemours Co., Inc., are a class of materials with significantly lower stiffness and heat resistance than semicrystalline or crystalline nylon, such as nylon 6 or nylon 6,6. Amorphous polyamides, also known as amorphous nylons include nylon copolymers whose monomers include nylon 6, nylon 6,6, and nylon 6,10 starting materials as well as terephthalic acid and alkyl substituted diamines. Aromatic polyamides may be included in this class of materials.

Other usable nylons may include those prepared from dodecanedioic acid and bis-para-aminocyclohexyl methane.

By physically blending polymers of polyketone with amorphous polyamides a high performance alloy of good impact strength with an increase in modulus, breaking strength, and lower cost is obtained.

The general class of polyketone polymers of carbon monoxide and one or more ethylenically unsaturated hydrocarbons has been known for some years. Brubaker, U.S. 2,495,286, produced such polymers of relatively low carbon monoxide content in the presence of free radical initiators such as benzoyl peroxide. British Patent 1,081,304 produced such polymers of higher carbon monoxide content in the presence of alkylphosphine complexes of palladium as catalyst. Nozaki extended the process to produce linear alternating polymers in the presence of arylphosphine complexes of palladium. See, for example, U.S. 3,694,412.

More recently, the class of linear alternating polymers of carbon monoxide and unsaturated hydrocarbons now known as polyketones, has become of greater interest, in part because of improved methods of production.

These polymers, often referred to as polyketone or polyketone polymers have been shown to be of the repeating formula ——CO—(A)—— where A is the moiety of an ethylenically unsaturated hydrocarbon polymerized through the ethylenic unsaturation. For example, when the ethylenically unsaturated hydrocarbon is ethylene, the polymer will be represented by the repeating formula ——CO——(CH$_2$CH$_2$)——.

The general process for preparing polyketones, is illustrated by a number of European Patent Applications including European Patent Application No. 0121965 directed towards a preparation of polyketones to obtain a high yield, wherein a mixture of carbon monoxide and alkenically unsaturated hydrocarbon is polymerized in the presence of Group VIII metal catalyst (such as palladium, cobalt or nickel) the anion of a strong non-hydrohalogenic acid having a pKa below 2, and a bidentate ligand of phosphorous, arsenic or antimony.

Polyketones prepared with the novel catalyst, result in a novel, linear alternating polyketone polymer which has not been blended with amorphous polyamides to form novel and useful blends having increased impact resistance at low temperatures compared to the polyketone alone as well as increases strength and stiffness.

SUMMARY OF THE INVENTION

The present invention is a blend of:

(a) a linear alternating polymer of carbon monoxide and at least one ethylenically unsaturated hydrocarbon., and (b) a wholly amorphous polyamide. The invention can be a melt blend of components (a) and (b).

The invention also relates to compositions wherein the ratio of the components designated as (a) and (b) are in ratios between 99:1 and 1:99; 5:95 and 95:5; 10:90 and 90:10; 20:80 and 80:20.

More specifically the invention relates to a blend wherein the linear alternating polymer is of the formula

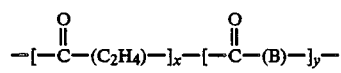

wherein B is the moiety of an ethylenically unsaturated α-olefin of at least 3 carbon atoms polymerized through the ethylenic unsaturation, the ratio of y:x is no more than about 0.5.

Further, the present invention relates to a process for preparing a blend of a linear alternating polymer of carbon monoxide and at least one ethylenically unsaturated hydrocarbon and an amorphous polyamide, wherein the process comprises the steps of:

(i) adding a linear alternating polymer of carbon monoxide and at least one ethylenically unsaturated hydrocarbon to an amorphous polyamide forming a mixture; and (ii) blending the mixture at temperatures between about 130° C and about 350° C. therein forming a polymer blend.

The present invention also relates to articles prepared from a polymeric composition comprising:

(a) a linear alternating polymer of carbon monoxide and at least one ethylenically unsaturated hydrocarbon; and (b) an amorphous polyamide.

DETAILED DESCRIPTION OF THE INVENTION

The polyketone polymers which are employed as a component of the blends of the invention are linear alternating polymers of carbon monoxide and at least one ethylenically unsaturated hydrocarbon. Suitable ethylenically unsaturated hydrocarbons for use as precursors of the polyketone polymers have up to 20 carbon atoms inclusive, preferably up to 10 carbon atoms inclusive, and are aliphatic such as ethylene and other α-olefins including propylene, butylene, isobutylene, 1-octene, and 1-dodecene, or are arylaliphatic containing an aryl substituent on an otherwise aliphatic moiety, particularly an aryl substituent on a carbon atom of the ethylenic unsaturation. Illustrative of this latter class of ethylenically unsaturated hydrocarbons are styrene, p-methylstyrene, p-ethylstyrene, and m-methylstyrene. Preferred polyketones are copolymers of carbon monoxide and ethylene or terpolymers of carbon monoxide, ethylene and a second ethylenically unsaturated hydrocarbon of at least 3 carbon atoms, particularly an α-olefin such as propylene.

The structure of the polyketone polymer is that of a linear alternating polymer of carbon monoxide and at least one ethylenically unsaturated hydrocarbon and the polymer will contain substantially one moiety of carbon monoxide for each moiety of unsaturated hydrocarbon. When terpolymers of carbon monoxide, ethylene and a second hydrocarbon are employed in the blends of the invention there will be within the terpolymer at least two units incorporating a moiety of ethylene for each unit incorporating a moiety of the second hydrocarbon, preferably from about 10 units to about 100 units incorporating a moiety of ethylene for each unit incorporating a moiety of the second hydrocarbon. The polymer chain is therefore represented by the formula

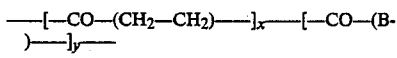

where B is the moiety obtained by polymerization of the second hydrocarbon through the ethYlenic unsaturation. The —[—CO—(CH$_2$—CH$_2$—)— units and the —CO—(B)— units are found randomly throughout the polymer chain and the ratio of y:x is no more than about 0.5. In the modification of the invention where copolymers of carbon monoxide and ethylene are employed as a blend component and there is no second hydrocarbon in the polymer chain, the polymer is represented by the above formula wherein y=0. If y is other than 0, i.e., terpolymers are employed, ratios of y:x should be no more than 0.5 and preferably from about 0.01 to about 0.2. The end groups or "caps" of the polymer chain will depend on what materials were present during the preparation of the polyketone polymer and whether and how the polymer was purified. The precise properties of the polymer will not depend to any considerable extent upon the particular end groups so that the polymer is fairly represented by the above formula for the polymer chain.

Of particular interest are those polyketones of high molecular weight from about 1,000 to about 500,000, especially those of molecular weight over 10,000. The physical properties of the polyketone polymers will depend in part on the molecular weight of the polymer, whether the polymer is a copolymer or a terpolymer and the proportion of the second hydrocarbon present in the case of a terpolymer.

Typical melting points are from about 130° C. to about 350° C., more typically from about 180° C to about 285° C. Polyketone polymers usable herein may have melting points of between about 190-230° C. and polymers with melting points ranging from about 230° C. to about 270° C. may be usable herein.

Useful polyketones for the novel blends have limiting viscosity numbers (LVN) as measured by the method wherein the polymer is dissolved in metacresol at 60° C., using a standard capillary viscosity measuring device, such as a Cannon-Ubbelohde viscometer in the range of 0.5 to 10 LVN and more preferably 0.8 to 4 LVN and most preferably 0.8 to 2.5 LVN.

A method for producing the polyketone polymers which is now becoming conventional is to contact the carbon monoxide and ethylenically unsaturated hydrocarbon(s) in the presence of a palladium compound, the anion of a non-hydrohalogenic acid having a pKa below about 6 and a bidentate phosphorus ligand. The scope of the process of polyketone production is extensive but, without wishing to be limited, a preferred palladium compound is a palladium carboxylate, particularly palladium acetate, the preferred anion is the anion of trifluoroacetic acid or p-toluenesulfonic acid, and the preferred bidentate ligand is 1,3-bis(diphenylphosphino)propane or 1,3-bis[di(2-methoxyphenyl)-phosphino]propane. Such a process for polyketone production is illustrated by copending U.S. application Ser. No. 930,468, filed Nov. 14, 1986.

Polymerization is conducted in a gas phase in either the absence of diluent or the substantial absence of diluent or in a liquid phase in the presence of an inert diluent such as an alkanol, e.g., methanol or ethanol. The reactants are contacted under polymerization conditions in the presence of the catalyst composition by conventional methods such as shaking or stirring. Suitable reaction temperatures are from about 20° C to about 150° C, preferably from about 50° C to about 135° C. Typical reaction pressures are from about 1 bar to about 200 bar, more typically from about 10 bar to about 100 bar. Subsequent to reaction the polymer product is recovered as by decantation or filtration. The polymer product may contain residues of the catalyst which are removed, if desired, by treatment with a solvent or a complexing agent which is selective for the residues.

The polyketone blends herein are limited to polyketone blending wherein some crystallinity occurs in one or more components of the polyketone blend while maintaining a blend of the amorphous phases of the components.

In the preferred embodiment, the invention is a mixture of (a) a major amount of a polyketone copolymer or terpolymer such as one of the types described above, with (b) a minor amount of an amorphous polyamide.

More specifically it is contemplated that a suitable polyketone/amorphous polyamide blend can be prepared from (a) about 1:99 weight percent polyketone, and (b) about 1:99 weight percent amorphous polyamide. Blends of components (a) and (b) may also be blended in relative proportions of about 80:20 weight percent polyketone with 20:80 weight percent amorphous polyamide, or ratios of 70:30 to 30:70, or 60:40 to 40:60, or may be, in approximately equal proportions by weight, i.e. (a):(b)=50:50.

The amorphous polyamide usable herein can be, for example, Zytel ™ 330 or Bexloy ™ AP C-803, both available from DuPont, or Trogamide ™ T, available from Kay Fries (Dynamit Nobel).

Zytel 330 (Nylon 6IcoT) is represented by the formula:

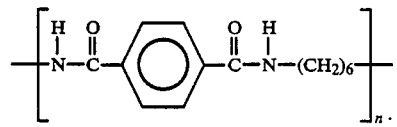

Zytel 330 (Nylon 6IcoT) from DuPont has a $M_n \times 10^{-3}$ of 14.1, a $M_w \times 10^{-3}$ of 49.8 and a $T_g$ of 127° C.

Bexloy AP C-803 (Cycloaliphatic Polyamide) is represented by the formula:

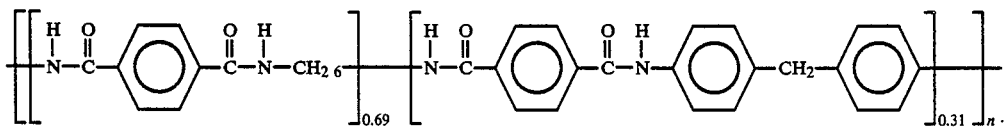

Bexloy AP C-803 (Cycloaliphatic Polyamide) from DuPont has a $T_g$ of 156° C.

Trogamid T (Nylon 3Me6T) is represented by the formula:

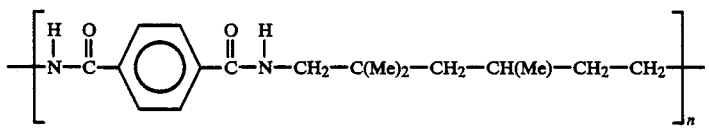

where Me is a methylene unit. Trogamid T (Nylon 3Me6T) from Kay Fries, (Dynamit Nobel) has a $M_n \times 10^{-3}$ of 20, a $M_w \times 10^{-3}$ of 63, and a $T_g$ of 147° C.

Additionally, Emser Werke from Switzerland sells an amorphous nylon available out of Europe, having a $T_g$ of about 160° C and the formula:

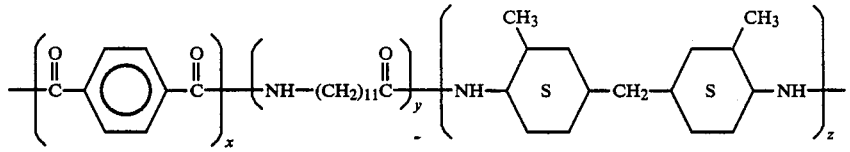

wherein x:y:z 1:1:1 is another amorphous nylon potentially usable herein.

The compositions of the invention may be modified by one or more conventional additives such as stabilizers and inhibitors of oxidative, thermal, and ultraviolet light degradation., lubricants and mold release agents, fire resistant materials, colorants including dyes and pigments, and other substances to modify the polymer. The additives can be incorporated into the composition at any stage in the preparation of the thermoplastic composition. Preferably the stabilizers are included early to preclude the initiation of degradation of the composition.

It is to be understood that in the specification and claims herein, unless otherwise indicated, when the amount of the amorphous polyamide or polyketone is expressed in terms of percent by weight, this percent by weight is based on the total amount of the entire blend.

EXAMPLES

The method of producing the blend of the polyketone polymer with the amorphous polyamide is not material as long as a relatively uniform distribution of the amorphous polyamide through the polyketone is obtained. It is preferred for the blend to have intimate mixing of the polymers, i.e. microscopic distribution of amorphous polyamide through the polyketone, having the size of the dispersed phase to be no more than about 10 microns, preferably less than about 1 micron. In one modification, the blend components are extruded and the blend is obtained as an extrudate. In an alternative modification, the components are blended in other mixing devices, such as high shear mixing devices or low shear mixing devices. It is also contemplated that the blends can be made by a masterbatch method, well known in the art.

To assist those skilled in the art in the practice of this invention, the following Blend Formulations are set forth as illustrations, part and percentages being by weight unless otherwise specifically noted.

Illustrative Blend Formulations

Embodiment 1: (Control)

98.5% by weight polyketone 088/005 (available from Shell Chemical Co. of Houston, Tex.) is a linear alternating terpolymer of carbon monoxide, ethylene and propylene, produced in the presence of a catalyst composition formed from palladium acetate, the anion of trifluoroacetic acid and 1,3-bis[diphenylphosphino]propane. The melting point of the terpolymer was 223° C. The polymer had a limiting viscosity number (LVN) of 1.79 (measured at 60° C in m-cresol). 1.0% by weight Surlyn ™ 9520 available from DuPont and 0.5% by weight Ethanox ™ 330 antioxidant were added to the polyketone polymer. This formulation is referred to hereafter as Formulation 1. The polyketone of Formulation 1 was cryoground under nitrogen using a 60–70 mesh, dried overnight at 50° C., injection molded into small plates, cut into strips, and aged in an oven for a period of days. These dry as molded specimens (referred to hereafter as Sample 1) were tested for impact strength using notched Izod testing, ASTM tests D-790, D-3029, D-638, and D-256. The test results appear in Table 1, below.

Embodiment 2:

80 wt % of polyketone material of Formulation 1 was cryoground using a 60 or 70 mesh and dry tumbled with 20 wt % of an amorphous polyamide, Zytel ™ 330, from DuPont. This dry tumbled 80/20 blend was charged to a one-stage twin screw co-rotating extruder, specifically a 30 mm Baker Perkins extruder. The extruder melt temperature profile varied from 220° C in the feed zone to up to 285° C at the die. A temperature of 260° C. at the die was preferred. A screw speed of about 300 rpm (50% torque maximum) was used. The blends were starve-fed into the extruder. The extruded strand was quenched in water at room temperature then chopped and pelletized. Pellets were molded into small plates, cut into strips and aged in an oven for a period of days. These specimens referred to hereafter as Sample 2, were tested for tensile strength using the indicated ASTM testing procedures; the test results appear in Table 1.

Embodiment 3:

60 wt % of polyketone material of Formulation 1 was cryoground using a 60 or 70 mesh then dry tumbled with 40 wt % Zytel ™ 330. The dry tumbled 60/40 blend was charged to a one stage twin screw, co-rotating extruder, specifically, a 30 mm Baker Perkins extruder. The blend was starve fed into the extruder. The extruder melt temperature profile varied from 220° C in the feed zone to up to 285° C at the die. A screw speed of 50% torque maximum at about 300 rpm was used. The extruded strand was quenched in water at room temperature then chopped and pelletized. Pellets were molded into small plates. Strips were cut from the plates and aged in an oven for a period of days. The specimens, referred to hereafter as Sample 3, were tested for tensile properties and the results appear on Table 1.

Embodiment 4:

Samples of 99w 330 with 1 wt % Surlyn ™ 9520 were prepared by blending in the manner described above to produce a comparative blend. These resultant samples referred to hereafter as Sample 4, were prepared and tested for notched Izod and the results appear on Table 1.

may be used to form the unique blends. In such a masterbatch process, a first polyketone can be blended, (such as by tumbling) with the amorphous polyamide. This first blend can be blended in an extruder at temperatures of 130° C to 350° C, extruded and quenched as described above. The resulting strand can be chopped into pellets. These pellets can then be optionally dried then, or mixed with a second polyketone polymer and re-blended or alternatively, added to additional first polyketone polymer already in pellet form and blended again. These mixed blend pellets and polyketone polymers can be blended at temperatures that range between 130° C to 350° C. Once blended, the polymer can be extruded and quenched as described above to form samples.

Beyond the compositions already described, two additional compositions were prepared and tested.

Embodiment 5:

100 wt % polyketone, 087/048 (available from Shell Chemical Co. of Houston, Texas) a linear alternating terpolymer of carbon monoxide, ethylene and propylene was produced in the presence of a catalyst composition formed from palladium acetate, the anion of trifluoroacetic acid and 1,3-bis[diphenylphosphino]propane. The melting point of the terpolymer was 221° C and the polymer had a limiting viscosity number (LVN) of 1.78 (measured at 60° C in m-cresol). The polyketone was cryoground under nitrogen using a 60-70 mesh, dried

TABLE 1

| | Sample | | | |
|---|---|---|---|---|
| | 1 | 2 | 3 | 4 |
| Zytel 330 (wt %) with 1% Zn Suryln | — | 20 | 40 | 100 |
| Polyketone 088/005 (wt %) with 1 wt % ZN Suryln and 0.5 wt % Ethanox 330 | 100 | 80 | 60 | — |
| Notched Izod impact at room temperature in ft. lbs/in | 4.94 | 5.15 | 3.66 | 4.45 |
| Tensile Properties According to ASTM D-256, D-638 and D-790 | | | | |
| Tangent Mod (psi) in units $\times 10^{-3}$ | 207 | 235 | 265 | Not tested |
| Stress Max (psi) in units $\times 10^{-3}$ | 8.7 | 8.8 | 10.5 | Not tested |
| Stress Break (psi) in units $\times 10^{-3}$ | 8.2 | 8.4 | 9.1 | Not tested |
| Elongation, Break | 163 | 35 | 113 | Not tested |
| % (range) | (22-257) | (4-116) | (27-229) | |

Within the scope of the invention variations in processing can be carried out. For example, the size of the extruder used to prepare the blend can be changed, for instance, a 15 mm twin screw extruders may be used to prepare the novel blends. The rpm speed and melt temperatures of the extruder may be varied yet still produce blends within the scope of the invention. Extruder temperatures ranging from 130° C to 350° C may be used herein, with temperatures ranging from 190° C to 280° C being preferred. Polymer can be fed into the extruder in extremes, such as starve-fed into the extruder or flood-fed, alternatively a feed rate in a range between the extremes is also contemplated as usable to produce blends which remain within the scope of the invention. The processing conditions should be regulated by methods known to those skilled in the art, to limit possible polymer degradation and achieve the desired intimate mixing of the polymers forming the blend.

Alternative methods for preparing the blend of this invention may be used, as indicated in the preceding paragraphs. The previously noted masterbatch method overnight at 50° C., molded into small plates, cut into strips, and aged in an oven for a period of days. The specimens, referred to hereafter as Sample 5, were tested for tensile properties. The test results appear in Table 2, below.

Embodiment 6:

80 wt % of the polyketone material of Embodiment 5 was cryoground using a 60 or 70 mesh and dry tumbled with 20 wt % of an amorphous polyamide, Zytel ™ 330, available from DuPont. The dry tumbled 80/20 blend was charged to a one-stage twin screw co-rotating extruder, a 30 mm Baker-Perkins extruder. The blends were starve-fed into the extruder. The extruder melt temperature profile varied from 220° C in the feed zone to up to 285° C at the die. A temperature of 250° C at the die was preferred. A screw speed of 50% torque maximum at about 300 rpm was used in the extruder. The extruded strand was quenched in water at room temperature then chopped and pelletized. Pellets were molded into small plates, cut into strips and aged in an oven for a period of days. The specimens, referred to hereafter as Sample 6, were tested for tensile properties. The test results appear in Table 2.

TABLE 2

|  | Notched Izod Ft. Lb/In | Tangent Modulus psi | Tensile Max. psi | Tensile Break psi | Elongation Break (%) |
|---|---|---|---|---|---|
| Sample 5 | 2.88 | 247497 | 10039 | 8931 | 77 |
| Sample 6 | 2.79 | 210663 | 9584 | 7831 | 187 |

Tensile Properties were determined according to ASTM tests D-256, D-638, and D-790.

It appears that by adding the amorphous nylon to the novel polyketone, modulus decreases, elongation increases, forming a blend with lower tensile properties.

The foregoing embodiments are intended to illustrate but not to limit the invention. Various modifications can be made in the invention without departing from the spirit and scope.

What is claimed is:

1. A composition comprising a blend of (a) a linear alternating polymer consisting essentially of polymerized units of carbon monoxide and at least one ethylenically unsaturated hydrocarbon and (b) a wholly amorphous polyamide polymer.

2. The composition of claim 1 wherein the ratio of linear alternating polymer of carbon monoxide and at least one ethylenically unsaturated hydrocarbon to the amorphous polyamide polymer is between about 1:99 and about 99:1, respectively.

3. The composition of claim 1, wherein said linear alternating polymer has repeating units of the formula

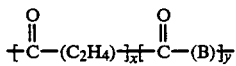

wherein B is the moiety of an ethylenically unsaturated α-olefin of at least 3 carbon atoms polymerized through the ethylenic unsaturation, and the ratio of y:x is no more than about 0.5.

4. The composition of claim 1, wherein said amorphous, polyamide polymer is selected from the group consisting of: polymer (A) represented by the formula:

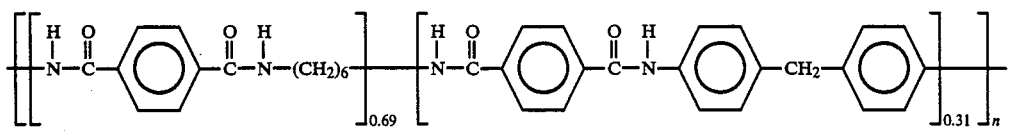

polymer (B) represented by the formula:

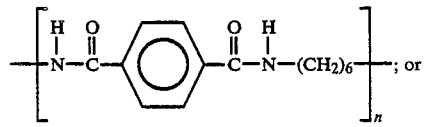

polymer (C) represented by the formula:

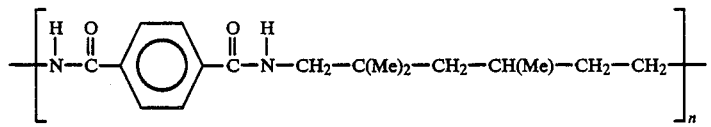

5. The composition of claim 3, wherein the ratio of y:x is about 0.01 to about 0.2.

6. The composition of claim 3 where y is zero.

7. The composition of claim 3, wherein B is propylene, and the ratio of y:x is from about 0.01 to about 0.2.

8. A process for preparing a blend of (a) a linear alternating polymer consisting essentially of polymerized units of carbon monoxide and at least one ethylenically unsaturated hydrocarbon and (b) a wholly amorphous polyamide wherein said process comprises the following steps:

(i) adding a linear alternating polymer consisting essentially of polymerized units of carbon monoxide and at least one ethylenically unsaturated hydrocarbon to a wholly amorphous polyamide forming a mixture; and (ii) blending the mixture at temperatures between about 130° C. and 350° C. therein forming a polymer blend.

9. The process of claim 8, wherein the blending is performed at temperatures between about 190° C. and about 285° C.

10. The process of claim 8, wherein the linear alternating polymer of carbon monoxide and at least one ethylenically unsaturated hydrocarbon to the amorphous polyamide is blended in a ratio between about 1:99 and about 99:1.

11. The process of claim 8, wherein said linear alternating polymer has repeating units of the formula:

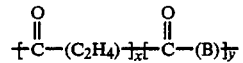

wherein B is the moiety of an ethylenically unsaturated α-olefin of at least 3 carbon atoms polymerized through the ethylenic unsaturation, and the ratio of y:x is no more than about 0.5.

12. The process of claim 8, wherein said amorphous, polyamide polymer is selected from the group consisting of: polymer (A) represented by the formula:

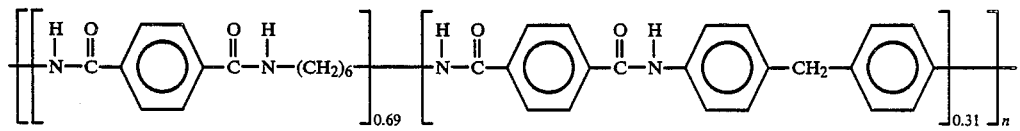

polymer (B) represented by the formula:

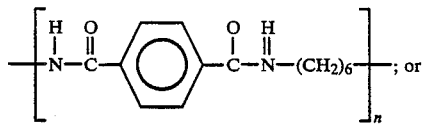

polymer (C) represented by the formula:

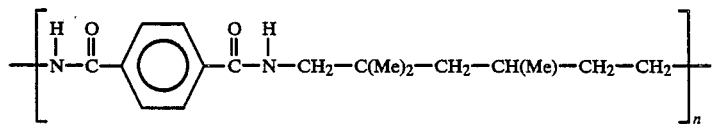

13. The process of claim 11, wherein the ratio of y:x is about 0.01 to about 0.2.
14. The process of claim 11, wherein y is zero.
15. The process of claim 11, wherein B is propylene and the ratio of y:x is from about 0.01 to about 0.2.
16. An article prepared from a polymeric composition comprising:
(a) a linear alternating polymer consisting essentially of polymerized units of carbon monoxide and at least one ethylenically unsaturated hydrocarbon; and
(b) a wholly amorphous polyamide.
17. The article of claim 16, comprising:
(a) from 1 to 99 percent by weight of a linear alternating polymer of carbon monoxide and at least one ethylenically unsaturated hydrocarbon; and
(b) from 99 to 1 percent by weight of an amorphous polyamide.

18. The article of claim 16, wherein said linear alternating polymer has repeating units of the formula:

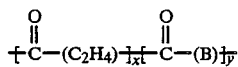

wherein B is the moiety of an ethylenically unsaturated α-olefin of at least 3 carbon atoms polymerized through the ethylenic unsaturation, and the ratio of y:x is no more than about 0.5.

19. The article of claim 16, wherein said amorphous, polyamide polymer is selected from the group consisting of: polymer (A) represented by the formula:

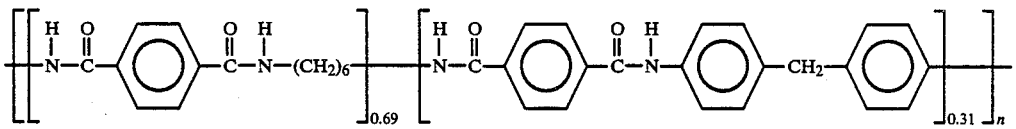

polymer (B) represented by the formula:

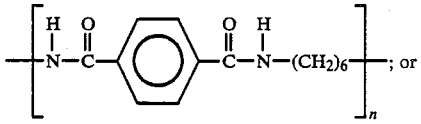

polymer (C) represented by the formula:

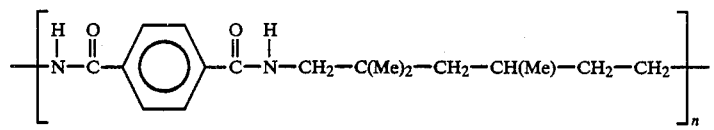

20. The article of claim 18 wherein B is propylene and the ratio of y:x is from about 0.01 to about 0.2.
21. The article of claim 18, wherein the ratio of y:x is about 0.01 to about 0.2.
22. The article of claim 18, wherein y is zero.

* * * * *